United States Patent [19]
Cheng

[11] Patent Number: 4,500,331
[45] Date of Patent: Feb. 19, 1985

[54] KITCHEN EXHAUST APPARATUS

[76] Inventor: Chung-Tsung Cheng, 32-1, Alley 9, Lane 390, Tun Hua South Rd., Taipei

[21] Appl. No.: 456,371

[22] Filed: Jan. 7, 1983

[51] Int. Cl.³ .............................................. B01D 45/14
[52] U.S. Cl. ...................................... 55/406; 55/467; 55/DIG. 36; 126/299 D
[58] Field of Search ................ 55/406, 467, DIG. 36; 98/43 R, 43 C, 115 R; 126/299; 415/121 A, 168

[56]  References Cited
U.S. PATENT DOCUMENTS 2,341,245  2/1944  Sonntag ........................... 126/299 D
3,002,725 10/1961  Ljungberg ...................... 415/168 X

FOREIGN PATENT DOCUMENTS 12293  4/1980  Japan ............................. 55/DIG. 36

Primary Examiner—Harold Joyce
Attorney, Agent, or Firm—Burns, Doane, Swecker and Mathis

[57] ABSTRACT

A kitchen exhaust apparatus comprises a fan housing which includes a cylindrical portion and an extension which extends tangentially and contiguously from the cylindrical portion. A bottom wall extends across the cylindrical portion and the extension, which bottom wall defines an inlet port in the cylindrical portion. A portion of the bottom wall located in the extension is sloped upwardly in a direction away from the cylindrical portion. An outlet port is located above such sloped portion of the bottom wall. A motor driven centrifugal fan is arranged in the cylindrical portion above the inlet port to draw-in air and cause particles entrained in the air to travel into the extension and upwardly and downwardly along the sloped portion. Drain apertures are located in the bottom wall so as to lie along the path of travel of such particles to facilitate drainage thereof into a gathering tray mounted beneath the fan housing.

10 Claims, 5 Drawing Figures

KITCHEN EXHAUST APPARATUS

BACKGROUND AND OBJECTS OF THE INVENTION

The present invention relates to kitchen exhaust fans, and particularly to an apparatus capable of separating liquid components, such as oleaginous substance, from heated vapor and smoke released during a cooking process, so as to discharge the liquid components and gases through separate outlets.

Prior art exhaust fans generally include a motor-driven fan mounted in a casing having an inlet port and an outlet port for exhausting gaseous emissions generated during a cooking process in the kitchen. A problem incident to such exhaust fans is that in cooking food products of a greasy nature, especially Chinese cuisine, oleaginous components entrained in the vapor or smoke tend to be separated from same by the centrifugal force produced by the rotating fan to deposit on the fan, the interior surfaces of the casing, and the surrounding area of the inlet port. These oleaginous components accumulate in droplets, which may sometimes be spattered out from the rim of the inlet port and drop down on the food being cooked to thereby contaminate the food. Particularly, the oleaginous may also condense in large quantities to become gelatinous masses plugging the gap between the inlet port and the fan blades. Thus, periodical cleaning of the exhaust fan is required, yet it is difficult and time-consuming to remove the gelatinous masses.

Various means for overcoming the abovementioned disadvantages have been provided. For example, the inlet port of the casing may be covered with a filter screen so that larger oleaginous components are absorbed by the filter screen when gaseous emissions containing same are being drawn into the casing. There may also be provided an annular groove around the inlet port, or a hole in the lowest rear portion of the casing, so that oleaginous components centrifugally separated from the gaseous emissions in the casing may be collected in the annular groove or converged to the hole to be removed manually. However, it has been discovered through long periods of observations and experiments by the inventor that the abovementioned devices, while functional, may not achieve the desired effect. For instance, while the filter screen may entrap oleaginous components, it may also become an obstacle to the drawing in of gaseous emissions through the inlet port, thus lowering the efficiency of the exhaust fan. Consequently, when it is desired to acquire as high an efficiency as would be possible if such a filter screen were not provided, a motor of higher power would be required and hence more electrical energy would be consumed. Nevertheless, sincle the oleaginous components adhering to the filter screen may eventually reduce the porous space of the filter screen, the filter screen must be removed from the inlet port to be cleaned; otherwise, once the oleaginous components have condensed in gelatinous masses on the filter screen, they may be melted by the heat generated during a cooking process and drop down on the food being cooked under the influence of gravity, thereby contaminating the food.

The invention is directed toward an apparatus which can overcome the abovementioned disadvantages.

SUMMARY OF THE INVENTION

It is the primary object of the invention to provide an apparatus which can effectively separate oleaginous and liquid components from gaseous emissions generated during a cooking process and prevent the oleaginous and liquid components subjected to centrifugal force from being thrown out of the inlet port of the fan housing by directing and collecting such components to ensure that the food being cooked and the kitchenware will not be contaminated.

It is another object of the invention to provide a kitchen exhaust apparatus which permits easy, quick and automatic cleaning of the fan blades and interior of the fan housing which may be contaminated by the oleaginous components by the spraying of a detergent into the apparatus being operated through the inlet port.

THE DRAWING

These and other objects and features of the invention will become apparent from the following description of preferred embodiments with reference to the accompanying drawings, wherein.

DETAILED DESCRIPTION OF PREFERRED EMBODIMENTS OF THE INVENTION

Figure 1:
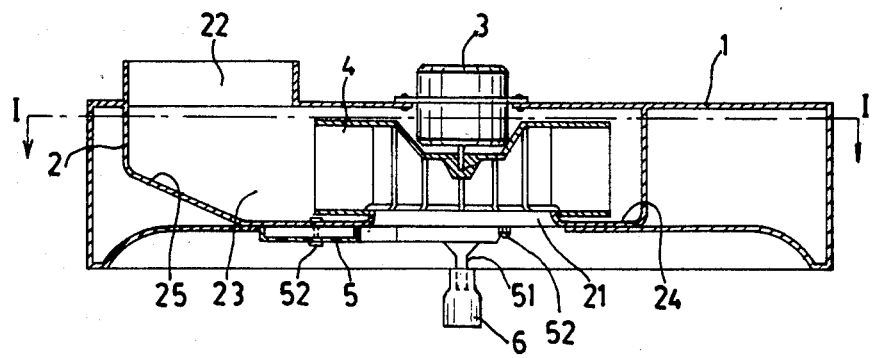
FIG. 1 is a longitudinal sectional view of an apparatus according to the invention.
Figure 2:
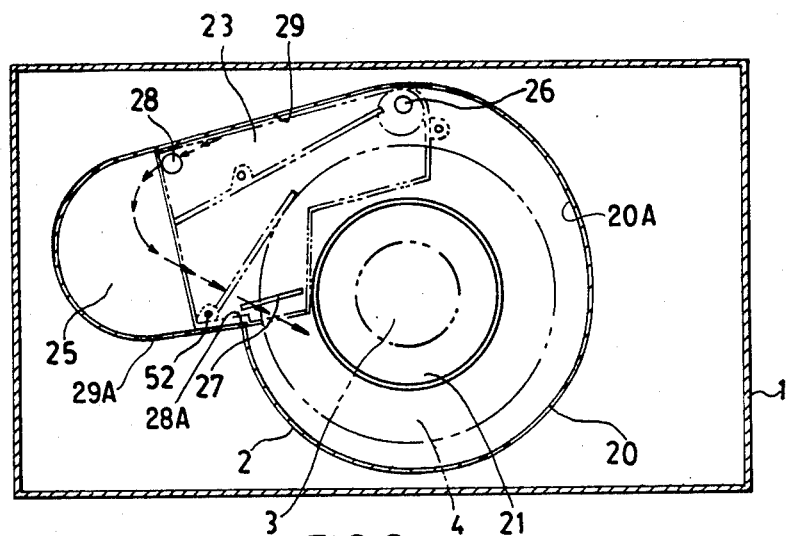
FIG. 2 is a cross sectional plan view taken on line I—I of FIG. 1, showing the apparatus after a motor and fan have been disassembled therefrom.
Figure 3:
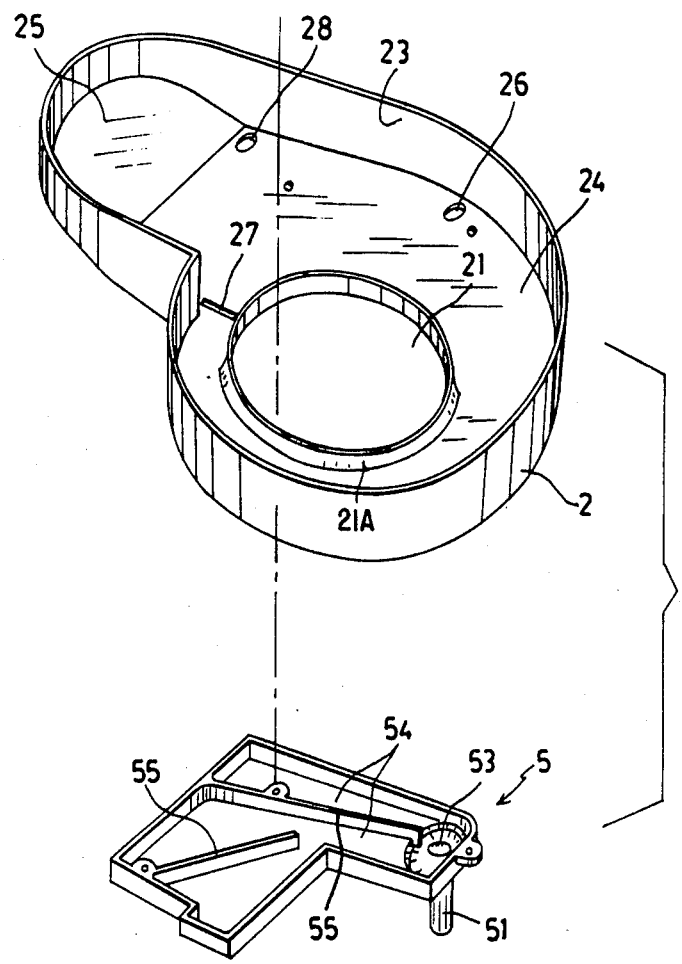
FIG. 3 is an exploded view in perspective of a housing and gathering plate detached from the apparatus according to the invention.

Referring to FIGS. 1-3, the apparatus of the invention includes a main housing 1, which is inclined rearwardly at an angle of 3°-15° such that any fluid which may be left in the apparatus will automatically flow to the lower rear part. A volute fan housing 2, mounted in the main housing 1, houses a centrifugal fan 4 adapted to be operated by an electrical motor 3 fixed to the main housing 1 above the centrifugal fan 4. The fan housing includes a cylindrical portion 20 having a curved outer wall 20A. The fan 4 is located in the cylindrical portion 20. The impeller of the centrifugal fan 4 is located above an inlet port 21 formed in the base or bottom wall 24 of the fan housing 2. An outlet port 22 is provided above the extended end portion 23 of the fan housing 2 and protrudes upwardly through the main housing 1.

A gathering tray or plate 5, best shown in FIG. 3, is fastened to the underside of the bottom wall 24 of the fan housing 2 adjacent to the extended end portion 23 of the housing 2. The gathering plate 5 is an L-shaped shallow plate with a drain tube 51 depending from the underside of the rear end of the gathering plate. A container 6 is detachably attached to the lower end of the drain tube 51 of the gathering plate 5.

An extended end portion 23 of the fan housing 2 is designed with a gradually upwardly inclined slope 25 formed in the bottom wall 24. The extension 23 includes first and second side walls 29, 29A which intersect the curved outer wall 20A. The bottom 24 of the fan housing 2 is provided with first, second and third drain apertures 28, 27 and 26 for drawing off any liquid which may be left in the fan housing. The third drain aperture 26 is disposed adjacent the point where the first side wall 29 is tangent to the curved outer wall 20A of the fan housing. Near the corner where the side wall 29 (FIG. 2) of the tangential extension 23 and the slope 25 of the fan housing meet is disposed the first drain aperture 28. The second drain aperture 27, preferably in the form of a narrow slot as shown in FIG. 3, is disposed adjacent the point of intersection 28A of the curved outer wall 20A of the cylindrical portion 20 and the second side wall 29A of the tangential extension 23 which is opposite to the first side wall 29. The drain apertures 26, 27 and 28 communicate with the gathering plate 5 attached to the underside of the fan housing 2.

As shown in FIG. 3, the gathering plate 5 is fastened to the fan housing 2 by screws 52 between the slope 25 and the inlet port 21. The gathering plate 5 has an outlet 53 leadig to the drain tube 51 and is divided into compartments 54 by spacing members 55 for guiding any liquid in the plate into the outlet 53. Of course, any liquid in the plate could flow to the outlet 53 even without the spacing members 55, because of the inclination of the main housing 1.

Figure 4:
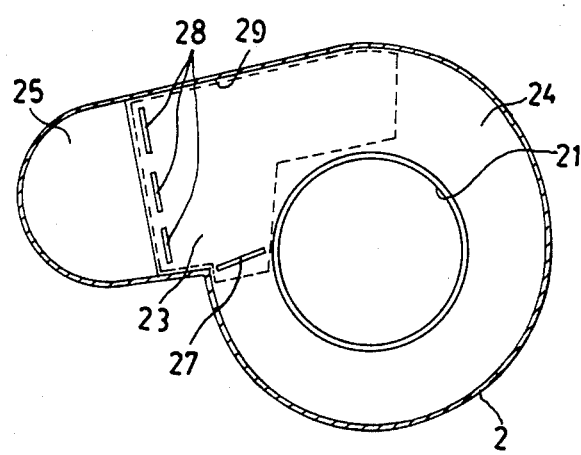
FIGS. 4 and 5 are cross sectional plan views of the housing of the apparatus, illustrating drain apertures arranged in different forms.
Figure 5:
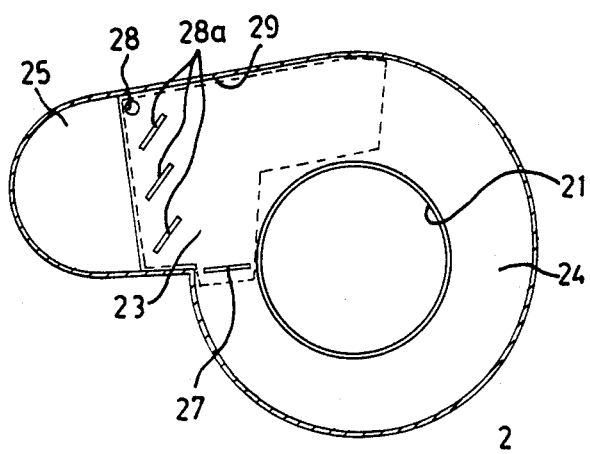

FIGS. 4 and 5 show different arrangements of drain apertures in the bottom wall 24 of the fan housing. Whereas the first drain aperture 28 adjacent the slope 25 is a round hole as heretofore described, in the embodiment of FIG. 4 there are a plurality of spaced apart drain slots 28 arranged in alignment with one another. In the embodiment of FIG. 5, in addition to the said round hole 28, the fan housing is further formed with a plurality of slant drain slots 28a in parallel with one another. In both embodiments, the drain aperture 27 is provided as previously described and the drain aperture 26 is absent. However, the drain aperture 26 may also be provided as will be explained later.

The mode of operation of the apparatus will be described in detail hereinafter.

When the motor 3 is actuated to cause the fan 4 to rotate, gaseous emissions containing oleaginous and liquid components will be drawn through the inlet port 21 into the fan housing 2, in which centrifugal force created by the rotary motion of the radial blades of the fan 4 acts to throw the gaseous emissions around the curved outer wall 20A of the fan housing. At the same time, the oleaginous and liquid components, greater in specific gravity than the gases in the gaseous emissions, are centrifuged out of the gas flow, with part of the oleaginous components being thrown to the drain aperture 26 in the direction indicated by the arrows shown in FIG. 2. When the rest of the oleaginous components and the gas flow hit the slope 25, the gas flow discharges through the outlet port 22 and the oleaginous components will, after condensing in droplets, slide down the slope 25 towards the inlet port 21. Since the drain aperture 27 is located between the slope 25 and the inlet port 21, the oleaginous components will trickle through the drain aperture 27, drop down on the gathering plate 5, and eventually flow into the container 6 via outlet 53 and drain tube 51 of the gathering plate.

According to the experiments conducted by the inventor with the same exhaust apparatus under the same condition, the effectiveness of the apparatus varies in accordance with variations in the number and arrangement of drain apertures provided.

(1) In case where only the drain aperture 26 is provided:
If 20 c.c. of aerosal fluid is sprayed through the inlet port 21 into the housing 2 when the apparatus is in use, a splash of the fluid out from the rim of the inlet port can be immediately observed. If the aerosal fluid to be sprayed into the housing is increased from 20 c.c. to 300 c.c., then the splash of the fluid from the inlet port is extremely serious and no fluid is found dropping down through the drain aperture 26.

(2) In case where only the drain aperture 28 is provided: If 1650 c.c. of aerosal fluid is sprayed into the housing when the apparatus is in use, a small amount of the fluid will splash out from the rim of the inlet port while a large amount of the fluid drains through the aperture 28.

(3) In case where only the drain aperture 27 is provided: If 200 c.c. of aerosal fluid is sprayed into the apparatus in use, only a small amount of the fluid will splash out. However, if the aerosal fluid sprayed into the apparatus is less than 200 c.c., then there will scarcely be any splash of the fluid and a large amount of the fluid will drain through the aperture 27, but the draining takes longer time than the draining described in the preceding paragraph. A small amount of the fluid will be collected in the gathering plate at a position corresponding to the aperture 28.

(4) In case where both drain apertures 27 and 28 are provided: If 200 c.c. of aerosal fluid is sprayed into the apparatus, virtually no splash of the fluid is seen and a large amount of the fluid drains through the apertures 27 and 28.

It can be understood from the foregoing description that oleaginous and liquid components contained in gaseous emissions generated during cooking can be effectively separated and gathered for discharge by the apparatus of the invention. Thus there will be no splash of oleaginous components out from the rim 21A of the inlet port which would otherwise contaminate the food being cooked or kitchenware. Particularly, although the interior surfaces of the apparatus and the fan is susceptible to contamination by oleaginous components adhering thereto over long periods of use, they may be easily and quickly cleaned by spraying an aerosal detergent into the apparatus through the inlet port, since the detergent will be thrown around against the fan blades and the curved outer wall of the housing and flow into the container 6 through the drain apertures and outlet 53. Accordingly, automatic cleaning of the apparatus can be conveniently accomplished by spraying an aerosal detergent into the apparatus without requiring the user to disassemble and wash the apparatus.

What is claimed is:

1. A kitchen exhaust apparatus comprising:
a fan housing including:
  a cylindrical portion having a curved outer wall,
  an extension contiguous with said cylindrical portion and having first and second side walls which intersect said curved outer wall, said first side wall being oriented tangentially relative to said curved outer wall,
  a bottom wall extending across said cylindrical portion and said extension, said bottom wall having:
    a vertical inlet portion disposed in said cylindrical portion and being spaced radially inwardly from said curved outer wall, and
    an upwardly sloped portion disposed in said extension between said side walls and sloping upwardly away from said cylindrical portion,
  means forming an outlet port above said sloped portion,
    a first drain aperture disposed in said bottom wall within said extension and located between said side walls and adjacent a lower end of said upwardly sloping portion, and a second drain aperture disposed in said bottom wall between said inlet port and a point of intersection of said second side wall with said curved outer wall, a motor-driven centrifugal fan arranged in said cylindrical portion above said inlet port to draw-in air and discharge the air through said outlet port and to impart centrifugal force to oleaginous and liquid particles entrained in the air, whereupon such particles travel along a path extending along said first side wall and upwardly along said sloped portion and then downwardly along said sloped portion toward said second drain aperture, with some of the particles falling through said first and second drain apertures, and a gathering tray disposed beneath said fan housing and said first and second apertures to catch particles falling through said first and second apertures.

2. Apparatus according to claim 1, wherein said first aperture is located closer to said first side wall than to said second side wall.

3. Apparatus according to claim 1, wherein there are a plurality of said first apertures extending along said lower end of said sloped portion.

4. Apparatus according to claim 3, wherein said first apertures comprise elongate parallel slits.

5. Apparatus according to claim 4, wherein said slits are oriented parallel to said lower end of said sloped portion.

6. Apparatus according to claim 4, wherein said slits are oriented at an angle relative to said lower end of said sloped portion.

7. Apparatus according to claim 1 including a third aperture in said bottom wall located adjacent the intersection of said curved outer wall and said first side wall.

8. Apparatus according to claim 7, wherein said third aperture is disposed adjacent a rearmost part of said fan housing, said housing being inclined toward the rear.

9. Apparatus according to claim 1, including a drain tube connected to said gathering tray and a container connected to said drain tube.

10. Apparatus according to claim 1, wherein said bottom wall includes an upstanding rim surrounding said inlet port.

* * * * *